(No Model.) 2 Sheets—Sheet 1.

S. RIEFLER.
PENDULUM ESCAPEMENT.

No. 508,760. Patented Nov. 14, 1893.

Attest:
F. H. Schott
M. C. Massie.

Inventor
Sigmund Riefler
by Max Georgii
Atty.

THE NATIONAL LITHOGRAPHING COMPANY,
WASHINGTON, D. C.

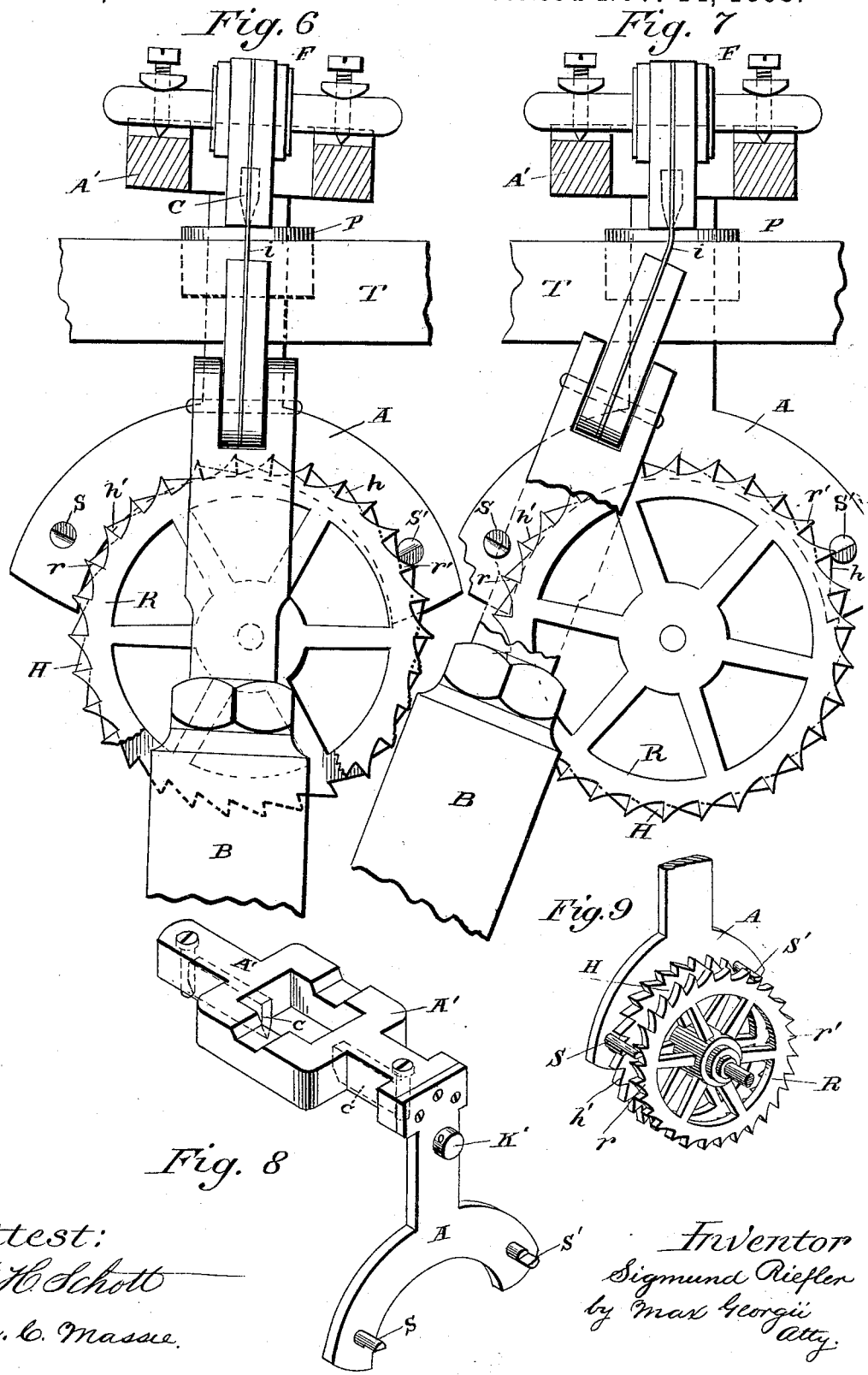

UNITED STATES PATENT OFFICE.

SIGMUND RIEFLER, OF MUNICH, GERMANY.

PENDULUM-ESCAPEMENT.

SPECIFICATION forming part of Letters Patent No. 508,760, dated November 14, 1893.

Application filed August 4, 1893. Serial No. 482,624. (No model.) Patented in Germany July 18, 1889, No. 50,739.

*To all whom it may concern:*

Be it known that I, SIGMUND RIEFLER, a subject of the King of Bavaria, residing at Munich, Bavaria, in the German Empire, have invented certain new and useful Improvements in Escapements, (patented in Germany on July 18, 1889, No. 50,739,) of which the following is a specification.

My invention relates to an improvement in pendulum escapements.

The object of my invention, which is adapted for all kinds of clocks of precision, is to secure greater accuracy in the motion of the clock than is obtained by those escapements with which I am acquainted.

In my escapement, the pendulum swings with perfect freedom, being connected with the clockwork solely through the pendulum spring from which it receives its impulse, this impulse being communicated in the axis of oscillation and at the moment when the pendulum swings through the dead point. The impulse is communicated by the wheelwork bending the pendulum spring a little at each oscillation of the pendulum, which produces a slight tension in the spring. This tension-force of the pendulum spring gives the pendulum the impulse. As this bending takes place round an axis which is identical with the axis of oscillation of the pendulum, and, further, occurs every time almost at the moment in which the pendulum is swinging through the dead point, I gain not only the perfect freedom of the pendulum, but also the great advantage that irregularities in the communication of force from the wheelwork and in the resistances to escape can exert no detrimental influence on the uniformity of the motion of the clock.

Figure 1:
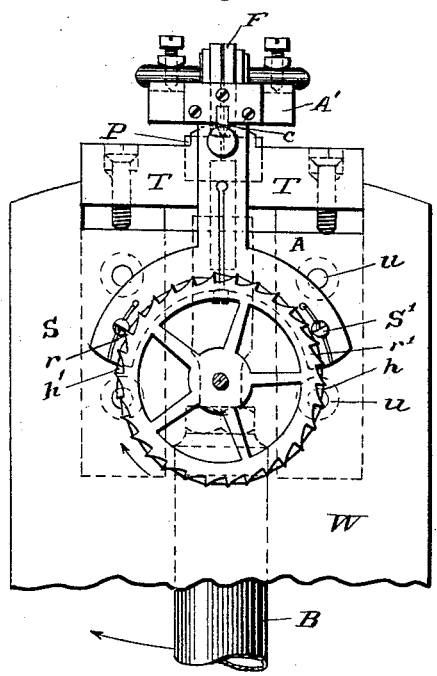
Figure 2:
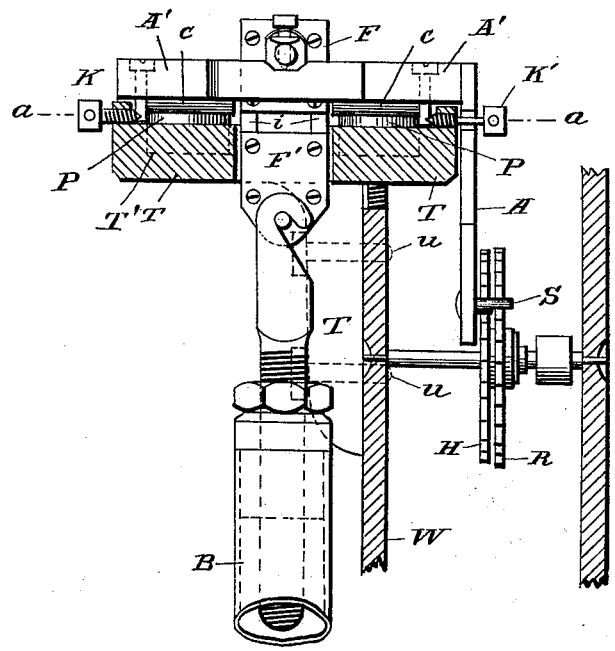
Figure 3:
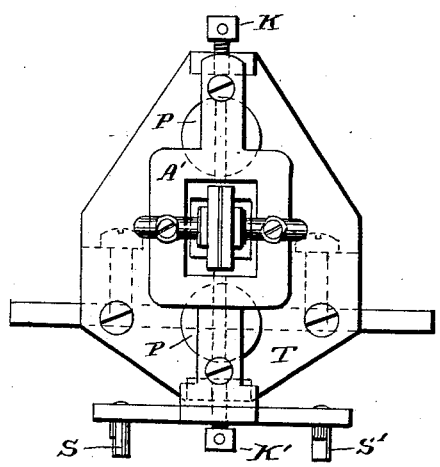
Figures 4, 5:
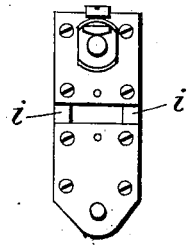

Figure 1 of the drawings shows a front view of an escapement embodying my invention; Fig. 2 a side view of the same. Fig. 3 is a view of the same from above. Figs. 4 and 5 are illustrations of the suspension device of the pendulum, with axis and pendulum spring. Fig. 6 is an elevation showing the position of the parts at the time when the anchor has reached the limit of its movement toward the left, and just before the momentum of the pendulum has bent the pendulum spring. Fig. 7 is a similar view, showing the same position of the parts, with the exception that the pendulum spring has been bent by the pendulum, which is now supposed to be at its extreme limit of movement to the left, the deflection of the pendulum, and the bend of the pendulum spring, being exaggerated to more fully illustrate the invention. Fig. 8 is a detail view of the anchor-piece, and Fig. 9 a perspective view of the escapement and locking wheel and adjacent parts.

T, T is a strong cast-metal support screwed by four screws, $u$, $u$, onto the back plate, W, of the clock. To this support are fixed the two stones, P, P, the plane surfaces of which together form a horizontal bearing. In the same plane with the surfaces of the two stones, P, is the axis of oscillation, $a$, $a$, of the anchor, A, this axis being formed by the knife-edges of the steel prisms, $c$, $c$. The axis of the anchor receives the necessary position for the regular locking of the anchor in the escape-wheels, H and R, from the conical ends of the screws, K, K', which, however, are screwed back a little when the pendulum, B, is suspended, in order not to interfere with the free play of the anchor.

F, F' is the suspension device of the pendulum placed on the anchor-piece, A, A', together with the pendulum spring, $i$, $i$, the axis of curvature of which is identical with the axis of rotation, $a$, $a$, of the anchor.

The escape-wheel is a double wheel, consisting of the driving wheel, H, and the rather large locking wheel, R. The teeth, $h$, $h'$, of the former, with their bevel surfaces, effect the driving, the teeth, $r$, $r'$, of the latter, with their radial surfaces, effecting the locking.

S and S' are the driving, and, at the same time, the locking pallets of the anchor. They are cylindrical, and are cut away at their front ends to the center of the axis of the cylinder.

On the cylinder surface, the driving of the anchor is effected by the teeth of the driving wheel, H, the locking being effected on the plane surfaces by the teeth of the locking wheel, R.

The play of the escapement is as follows: Fig. 1 shows the escapement at the moment when the pendulum is at the dead point and the tooth, $r$, of the locking wheel rests on the flat surface of the pallet, S. Now, when the pendulum swings out to the left in the direction of the arrow, the pendulum spring, $i, i$, at first remains quite straight and the beginning of the oscillation takes place round the knife-edge axis, $a, a$, of the anchor. The anchor, A, being connected with the pendulum by the pendulum-spring, $i, i$, will share this oscillation of the pendulum until the point of the tooth, $r$, of the locking wheel, falls from the locking surface of the pallet, S. Up to this point, the pendulum has described an arc of about one-fourth degree. By this time the cylinder surface of the pallet, S', has approached the driving tooth, $h$, of the driving wheel, up to the necessary nearness for play, the wheels revolving in the direction of the arrows until the locking tooth, $r'$, lies on the plane surface of the pallet, S', and, during this revolution, the driving tooth, $h$, effects the driving: i. e., it forces the pallet, S', back, and thus moves the anchor in an opposite direction to that in which the pendulum oscillates. By means of this revolving motion of the anchor, effected by the wheel-work, the pendulum spring, $i, i$, is slightly bent round the axis of oscillation, $a, a$, and thus receives a slight tension which imparts the impulse to the pendulum. The pendulum, however, does not immediately yield to the impelling force, but first completes its oscillation to the left, the anchor remaining the while at rest. This complementary arc amounts to from one degree to one and one-fourth degrees in astronomical clocks, and to two and one-half degrees in large turret clocks. As the pendulum returns, and after it has passed the dead point toward the right, the tooth, $r'$, which had been resting upon S', becomes free, and a fresh drive takes place on the other side, by means of the tooth, $h'$.

Having thus fully described my invention, what I claim as new, and desire to secure by Letters Patent, is—

1. In an escapement, a driving wheel, a locking wheel, and an anchor provided with a pallet arranged to engage with both the driving and the locking wheels, said anchor swinging in a plane at right angles to the axis of both wheels, substantially as set forth.

2. In an escapement, an anchor provided with an anchor-piece, a pendulum suspension device mounted on the anchor-piece, a pendulum, and a pendulum spring connecting the pendulum and the suspension device, substantially as set forth.

3. In an escapement, a bearing, an anchor-piece provided with knife-edges resting on the bearing, a pendulum suspension device supported on the anchor-piece, a pendulum, and a pendulum spring connecting the pendulum to the suspension device, substantially as set forth.

4. In an escapement, a locking wheel, and a driving wheel, an anchor having an anchor-piece provided with knife-edges, a bearing on which the knife-edges rest, a pair of pallets on the anchor and engaging both the locking and driving wheels, a suspension device mounted on the anchor-piece, a pendulum, and a pendulum spring connecting the pendulum with the suspension device, substantially as set forth.

5. In an escapement, a support, a bearing secured to the support, an anchor provided with an anchor-piece having a knife-edge resting on the bearing, a locking and a driving wheel rotatable on the same axis, a pallet on each end of the anchor, each pallet being arranged to engage both the locking and the driving wheels, a pendulum suspension device mounted on the anchor-piece, a pendulum, and a pendulum spring connecting the pendulum to the suspension device, substantially as set forth.

6. In an escapement, a driving wheel and a locking wheel, both rotatable on the same axis, an anchor, and a pallet at each end of the anchor, each pallet having a cylindrical portion for engagement with the driving wheel and a semi-cylindrical portion for engagement with the locking wheel, substantially as set forth.

In testimony that I claim the foregoing as my invention I have signed my name in presence of two subscribing witnesses.

SIGMUND RIEFLER.

Witnesses:
ALBERT WEICKMAN,
C. MAYER.